(12) United States Patent
Jang et al.

(10) Patent No.: US 12,078,076 B2
(45) Date of Patent: Sep. 3, 2024

(54) RING SEGMENT AND TURBOMACHINE INCLUDING SAME

(71) Applicant: DOOSAN ENERBILITY CO., LTD., Changwon (KR)

(72) Inventors: Yun Chang Jang, Gimhae (KR); Simon Hauswirth, Baden (CH); Richard Jones, Baden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/338,449

(22) Filed: Jun. 21, 2023

(65) Prior Publication Data

US 2023/0366327 A1 Nov. 16, 2023

Related U.S. Application Data

(63) Continuation of application No. 17/585,667, filed on Jan. 27, 2022, now Pat. No. 11,725,538.

(30) Foreign Application Priority Data

Feb. 24, 2021 (KR) .................. 10-2021-0024619

(51) Int. Cl.
*F01D 25/14* (2006.01)
*F01D 9/04* (2006.01)
(Continued)

(52) U.S. Cl.
CPC .............. *F01D 25/14* (2013.01); *F01D 9/04* (2013.01); *F01D 9/041* (2013.01); *F01D 11/08* (2013.01);
(Continued)

(58) Field of Classification Search
CPC .......... F01D 11/08; F01D 25/12; F01D 25/14; F05D 2240/11; F05D 2260/201; F05D 2260/232
See application file for complete search history.

(56) References Cited

U.S. PATENT DOCUMENTS 5,993,150 A * 11/1999 Liotta .................. F01D 11/10
                                                       415/115
7,517,189 B2 * 4/2009 Camus ................. F01D 9/04
                                                     415/173.1
(Continued)

FOREIGN PATENT DOCUMENTS

CN    001380487 A    11/2002
CN    101037947 A    9/2007
(Continued)

*Primary Examiner* — Courtney D Heinle
*Assistant Examiner* — Danielle M. Christensen
(74) *Attorney, Agent, or Firm* — Harvest IP Law, LLP

(57) ABSTRACT

A ring segment and a turbomachine including the ring segment are provided. The ring segment installed on an inner circumferential surface of a casing and disposed to face an end of a blade existing inside the casing, the ring segment includes a segment body disposed inside the casing in a radial direction of the casing and having a channel through which cooling air flows, and a pair of segment protrusions protruding outward from the segment body, coupled to the inner circumferential surface of the casing, and spaced apart from each other along a flow direction of fluid flowing through the casing to form an RS cavity through which cooling air flows, wherein the segment body includes a cavity for supplying cooling air introduced from the RS cavity to the channel.

18 Claims, 6 Drawing Sheets

(51) Int. Cl.
  *F01D 11/08*    (2006.01)
  *F01D 25/12*    (2006.01)

(52) U.S. Cl.
  CPC .......... *F01D 25/12* (2013.01); *F05D 2240/11* (2013.01); *F05D 2260/201* (2013.01); *F05D 2260/232* (2013.01)

(56) References Cited

U.S. PATENT DOCUMENTS

| | | | |
|---|---|---|---|
| 7,670,108 B2 * | 3/2010 | Liang | .................... F01D 11/008 |
| | | | 415/173.1 |
| 8,388,300 B1 | 3/2013 | Liang | |
| 2006/0140753 A1 | 6/2006 | Romanov | |
| 2008/0118346 A1 | 5/2008 | Liang | |
| 2011/0182724 A1 | 7/2011 | Koyabu | |
| 2012/0057968 A1 | 3/2012 | Lee | |
| 2013/0323033 A1 | 12/2013 | Lutjen | |
| 2014/0341711 A1 | 11/2014 | Taylor | |
| 2015/0300195 A1 | 10/2015 | Lutjen | |
| 2020/0408108 A1 | 12/2020 | Jang | |

FOREIGN PATENT DOCUMENTS

| | | |
|---|---|---|
| CN | 106133295 A | 11/2011 |
| CN | 107923246 A | 4/2018 |

\* cited by examiner

RING SEGMENT AND TURBOMACHINE INCLUDING SAME

CROSS REFERENCE TO RELATED APPLICATION

This is a Continuation Application of U.S. application Ser. No. 17/585,667 filed on Jan. 27, 2022 which claims priority to Korean Patent Application No. 10-2021-0024619, filed on Feb. 24, 2021, the disclosure of which is incorporated herein by reference in its entirety.

BACKGROUND

1. Field

Apparatuses and methods consistent with exemplary embodiments relate to a ring segment and a turbomachine including the same, and more particularly, to a ring segment installed on an inner circumferential surface of a casing and disposed to face an end of a blade installed in the casing, and a turbomachine including the same ring segment.

2. Description of the Related Art

A turbomachine refers to a device that generates a driving force used to generate electric power with fluid (e.g., gas) passing through the turbomachine. Therefore, a turbomachine and a generator are usually used together. The turbomachine may include gas turbines, steam turbines, and wind power turbines. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator to rotate the turbine blades.

The turbine includes a turbine stator and a turbine rotor which is installed in the turbine stator. Here, the turbine stator includes a turbine casing, turbine vanes coupled to an inner circumferential surface of the turbine casing, and a ring segment coupled to the inner circumferential surface of the turbine casing and disposed between adjacent turbine vanes in a flow direction of combustion gas or steam. The turbine rotor includes a turbine disk and turbine blades coupled to an outer circumferential surface of the turbine disk.

Ring segments are installed in the turbine to prevent a leakage of high-temperature and high-pressure combustion gas which rotates the rotor and consequently enhances the efficiency of the gas turbine. To prevent the ring segments from being damaged by the heat of the combustion gas or steam flowing through the turbine casing, each of the ring segments includes a cooling channel through which cooling air flows. Related art ring segments are designed to have a simple structure in which air introduced into a gap between the turbine casing and the ring segment is directly introduced into the cooling channel for circulation. On the other hand, the structure of turbomachines has been continuously modified to improve the efficiency thereof. With this trend, the temperature of an inlet portion of a turbine has increased. Therefore, it is difficult to effectively and sufficiently cool the related art ring segments due to the increased inlet temperature of the turbine.

In a turbine, a plurality of ring segments are arranged at intervals along the circumferential direction of the turbine casing, and each of the ring segments is heated even by the high-temperature fluid (e.g., combustion gas or steam) flowing between the ring segments adjacent to each other. For this reason, the structure of the related art ring segments has a problem in that it is difficult to effectively cool opposed surfaces of the ring segments adjacent to each other.

SUMMARY

Aspects of one or more exemplary embodiments provide a ring segment with improved structure for easy cooling to effectively cope with an increasing inlet temperature, and a turbomachine including the same ring segment.

Additional aspects will be set forth in part in the description which follows and, in part, will become apparent from the description, or may be learned by practice of the exemplary embodiments.

According to an aspect of an exemplary embodiment, there is provided a ring segment installed on an inner circumferential surface of a casing and disposed to face an end of a blade disposed inside the casing, the ring segment including: a segment body disposed inside the casing in a radial direction of the casing and having a channel through which cooling air flows; and a pair of segment protrusions protruding outward from the segment body, coupled to the inner circumferential surface of the casing, and spaced apart from each other along a flow direction of fluid flowing through the casing to form an RS cavity through which cooling air flows, wherein the segment body includes a cavity for supplying the cooling air introduced from the RS cavity to the channel.

According to an aspect of another exemplary embodiment, there is provided a turbo machine including: a stator comprising a casing through which fluid passes, a vane coupled to an inner circumferential surface of the casing to guide the fluid, and a ring segment installed on the inner circumferential surface of the casing and disposed between vanes adjacent to each other in a flow direction of the fluid; and a rotor comprising a disk installed inside the stator, and a blade coupled to an outer circumferential surface of the disk and rotated by the fluid. The ring segment includes: a segment body disposed inside the casing in a radial direction of the casing and having a channel through which cooling air flows; a pair of segment protrusions protruding outward from the segment body, coupled to the inner circumferential surface of the casing, and spaced apart from each other in a flow direction of the fluid flowing through the casing to form an RS cavity through which the cooling air flows, wherein the segment body includes a cavity for supplying the cooling air introduced from the RS cavity to the channel.

The channel may be disposed close to the segment body in the radial direction of the casing and include a plurality of cooling channels through which cooling air flows upstream or downstream in the flow direction of the fluid. The cavity may include a cooling cavity disposed outside the plurality of cooling channels. The segment body may include a plurality of cooling holes through which cooling air is supplied to the cooling cavity from the RS cavity.

The plurality of cooling channels may include: a plurality of first cooling channels passing through a downstream end of the segment body in the flow direction of the fluid flowing through the casing, extending upstream from the downstream end of the segment body, and extending in a reverse direction downstream from an upstream side of the segment body; and a plurality of second cooling channels alternately disposed with the plurality of first cooling channels, passing through an upstream end of the segment body in the flow direction of the fluid flowing through the casing, extending downstream from the upstream end of the segment body, and extending in a reverse direction upstream from a downstream side of the segment body.

The cooling cavity may be divided into a first cooling cavity communicating with the first cooling channel and a second cooling cavity communicating with the second cooling channel by a partition wall installed therein.

A plurality of ring segments may be provided and arranged at intervals in a circumferential direction of the casing. The channel may include a plurality of auxiliary channels from which cooling air is blown to the segment body of a next ring segment, and the cavity may include a first auxiliary cavity supplying cooling air to the plurality of auxiliary channels.

The cavity may be disposed between the first auxiliary cavity and the plurality of auxiliary channels and may further include a second auxiliary cavity disposed inside the first auxiliary cavity in the radial direction of the casing, receiving the cooling air introduced into the first auxiliary cavity from the RS cavity, and supplying the received cooling air to the plurality of auxiliary channels.

The segment body may include a plurality of cooling holes through which the cooling air is supplied to the first auxiliary cavity from the RS cavity. The cavity may further include a plurality of intermediate cavities connecting the first auxiliary cavity and the second auxiliary, and the plurality of intermediate cavities may be disposed between the plurality of auxiliary holes when viewed from outside of the segment body in the radial direction of the casing.

The plurality of intermediate cavities may be formed to have a curvature and may be formed such that the plurality of intermediate cavities are bent radially inward from the first auxiliary cavity and are connected to a radially outer portion of the second auxiliary cavity.

A plurality of ring segments may be provided and arranged at intervals in a circumferential direction of the casing. The channel may include a plurality of cooling channels disposed adjacent to an inner surface of the segment body in the radial direction of the casing and a plurality of auxiliary channels spaced apart from the plurality of cooling channels in the circumferential direction of the casing and configured to blow cooling air to the segment body of a next ring segment. The cavity may include a cooling cavity disposed outside the plurality of cooling channels and a first auxiliary cavity spaced apart from the cooling cavity in the circumferential direction of the casing and configured to supply cooling air to the plurality of auxiliary channels.

The cavity may be disposed between the first auxiliary cavity and the plurality of auxiliary channels and further include a second auxiliary cavity disposed inside the first auxiliary cavity in the radial direction of the casing, receiving the cooling air introduced into the first auxiliary cavity from the RS cavity, and supplying the received cooling air to the multiple auxiliary channels, and the second auxiliary cavity may be disposed between the plurality of cooling channels and the plurality of auxiliary channels.

The ring segment according to one or more exemplary embodiments may include a cavity into which cooling air can be introduced and a channel through which the cooling air supplied from the cavity flows. The cooling air primarily cools the ring segment by colliding with the inner wall surface of the cavity when flowing into the cavity, and secondarily cools the outer surface of the ring segment by flowing into the channel from the cavity and flowing through the channel. Accordingly, the ring segment according to the exemplary embodiment can be cooled more effectively.

In addition, the ring segment according to one or more exemplary embodiments may include first and second auxiliary cavities and an auxiliary channel formed therein so that cooling air passing through the first and second auxiliary cavities and the auxiliary channel in one ring segment is sprayed toward an adjacent ring segment. Therefore, opposed surfaces of the ring segments adjacent to each other can be cooled effectively although the opposed surfaces of the ring segments are heated by a high-temperature fluid (e.g., combustion gas or steam) flowing through between each of the ring segments.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
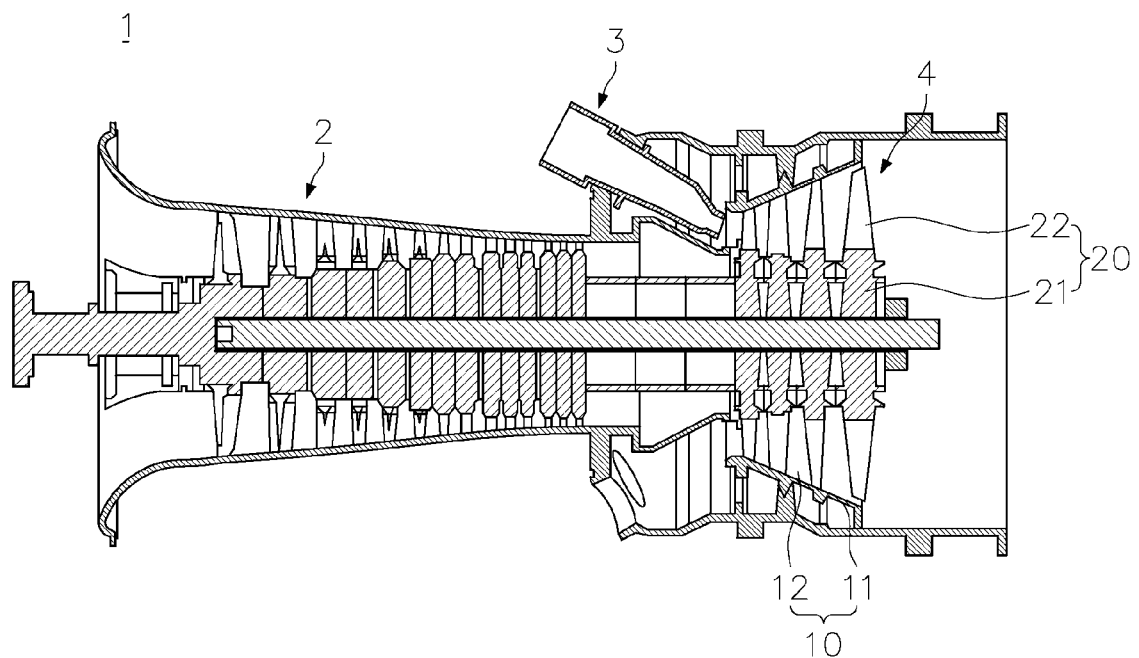
FIG. 1 is a cross-sectional view illustrating a gas turbine according to an exemplary embodiment.

Various changes and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the sprit and technical scope disclosed herein.

The terminology used herein is for the purpose of describing specific embodiments only, and is not intended to limit the scope of the disclosure. The singular expressions "a", "an", and "the" may include the plural expressions as well, unless the context clearly indicates otherwise. In the disclosure, the terms such as "comprise", "include", "have/has" should be construed as designating that there are such features, integers, steps, operations, components, parts, and/or combinations thereof, not to exclude the presence or possibility of adding one or more other features, integers, steps, operations, components, parts and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a ring segment and a turbomachine including the ring segment will be described with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, some components in the accompanying drawings are exaggerated, omitted, or schematically illustrated.

FIG. 1 is a cross-sectional view illustrating a gas turbine according to an exemplary embodiment. Referring to FIG. 1, a gas turbine 1 includes a compressor 2, a combustor 3, and a turbine 4. In a flow direction of gas (for example, compressed air or combustion gas), the compressor 2 is disposed on an upstream side of the gas turbine 1 and the turbine 4 is disposed on a downstream side of the gas turbine 1. The combustor 3 is disposed between the compressor 2 and the turbine 4.

The compressor 2 includes compressor vanes and compressor rotors in a compressor casing. The turbine 4 includes turbine vanes 12 and turbine rotors 20 in a turbine casing 11. The compressor vanes and the compressor rotors are arranged in multiple stages along the flow direction of compressed air, and the turbine vanes 12 and the turbine rotors 20 are also arranged in multiple stages along the flow direction of combustion gas. The compressor 2 has an internal space of which a volume decreases from a front stage to a rear stage so that the introduced air can be compressed while passing through the inside of the compressor 11, whereas the turbine 4 has an internal space of which a volume increases from a front stage to a rear stage so that the combustion gas supplied from the combustor 3 can expand while passing through the inside of the turbine 4.

In addition, a torque tube serving as a torque transmission member is disposed between the last-stage compressor rotor of the compressor 2 and the first-stage turbine rotor of the turbine 4 to transfer the torque generated by the turbine 4 to the compressor 2. Although the torque tube may include a plurality of torque tube disks arranged in three stages as illustrated in FIG. 1, this is only an example, and the torque tube may include torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction of the compressor. That is, the compressor disks are arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer surface of each of the compressor disks along a circumferential direction of the compressor disk. For each compressor stage, the plurality of compressor vanes are coupled to inner surface of the compressor casing in the circumferential direction are alternately arranged with the plurality of compressor blades. While the compressor disks rotate along with a rotation of the tie rod, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be collectively defined as a compressor stator to be distinguished from the compressor rotor.

The tie rod is installed to extend through the centers of the plurality of compressor disks and the plurality of turbine disks such that one end of the tie rod is fastened to the compressor disk located on the foremost end side of the compressor, and the other end thereof is fastened by a fixing nut.

Because the tie rod may be formed in various structures according to a type of a gas turbine, a shape of the tie rod is not limited to the example illustrated in FIG. 1. There are three types of tie rod including a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases a pressure of fluid flowing into the combustor and adjusts a flow angle of the fluid to be substantially equal to the designed flow angle.

The combustor 3 mixes the introduced compressed air with fuel and burns the air-fuel mixture to produce high-temperature and high-pressure combustion gas, thereby raising the temperature of the combustion gas to a heat-resistant temperature by which components of the combustor and components of turbine can endure through an isothermal combustion process.

A plurality of combustors constituting the combustor 3 may be arranged in a form of a cell in a combustor casing. Each combustor 3 includes a nozzle for injecting fuel, a liner defining a combustion chamber, and a transition piece connecting the combustion chamber and the turbine.

The liner defines the combustion chamber in which the fuel injected through the fuel injection nozzle and the compressed air fed from the compressor are mixed and burned. That is, the liner includes the combustion chamber in which the fuel-air mixture is combusted and a liner annular flow passage that surrounds the combustion chamber to provide an annular space. The nozzle for injecting fuel is installed in a front end of the liner, and an igniter is installed in a side wall of the liner.

In the liner annular flow passage, compressed air introduced through a plurality of holes formed in an outer wall of the liner flows, and the introduced compressed air cools the liner while flowing toward the transition piece. Because the compressed air flows along the outer surface of the liner, it is possible to prevent the liner from being thermally damaged by high temperature combustion gas.

The transition piece is coupled to the rear end (i.e., downstream end) of the liner to deliver the combustion gas to the turbine. The transition piece has a transition piece annular flow passage surrounding an inner space of the transition piece, and compressed air flowing through the transition piece annular flow passage cools an outer surface of the transition piece, thereby preventing the transition piece from being thermally damaged by high temperature combustion gas.

The high-temperature and high-pressure combustion gas supplied to the turbine 4 expands while passing through the inside of the turbine 4. The expansion of the combustion gas causes impulse and reaction forces with respect to the turbine blades 22, thereby generating torque. The torque is transferred to the compressor through the torque tube, and an excessive portion of the torque exceeding the power required to driving the compressor is used to drive a generator or the like.

The turbine 4 is similar in structure to the compressor 2. That is, the turbine 4 includes a plurality of turbine rotors 20 similar to the compressor rotors of the compressor 2. Each turbine rotor 20 includes a turbine disk 21 and a plurality of turbine blades 22 radially coupled to an outer surface of the turbine disk 21. The turbine disk 21 and the plurality of turbine blades 22 are designed in a structure in which they are arranged in a multi-stage to be spaced apart from each other along a flow direction of the combustion gas. A plurality of turbine vanes 12 are radially coupled to the inner surface of the turbine casing 11 along the circumferential direction such that each stage of turbine vanes 12 is disposed between adjacent stages of the turbine blades 22 to guide the flow direction of the combustion gas passing through the turbine blades 22. Here, the turbine casing 11 and the turbine vanes 12 may be collectively defined as a turbine stator 10 to distinguish them from the turbine rotor 20.

Figure 2:
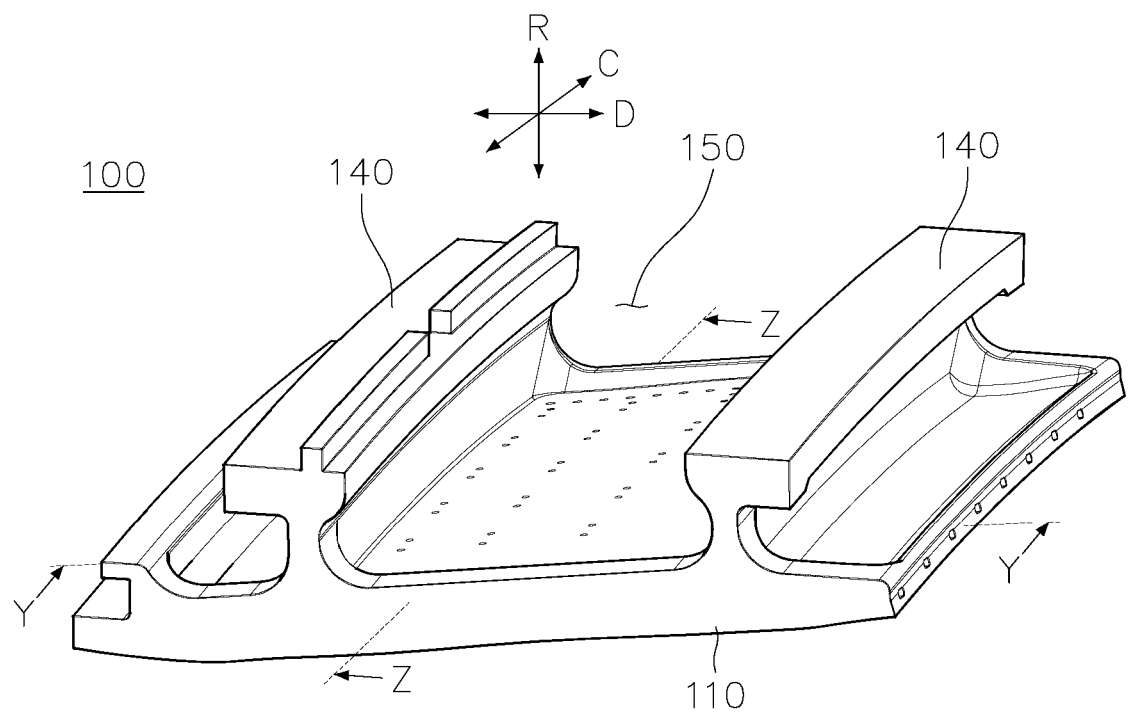
FIG. 2 is a perspective view of a ring segment according to an exemplary embodiment.
Figure 3:
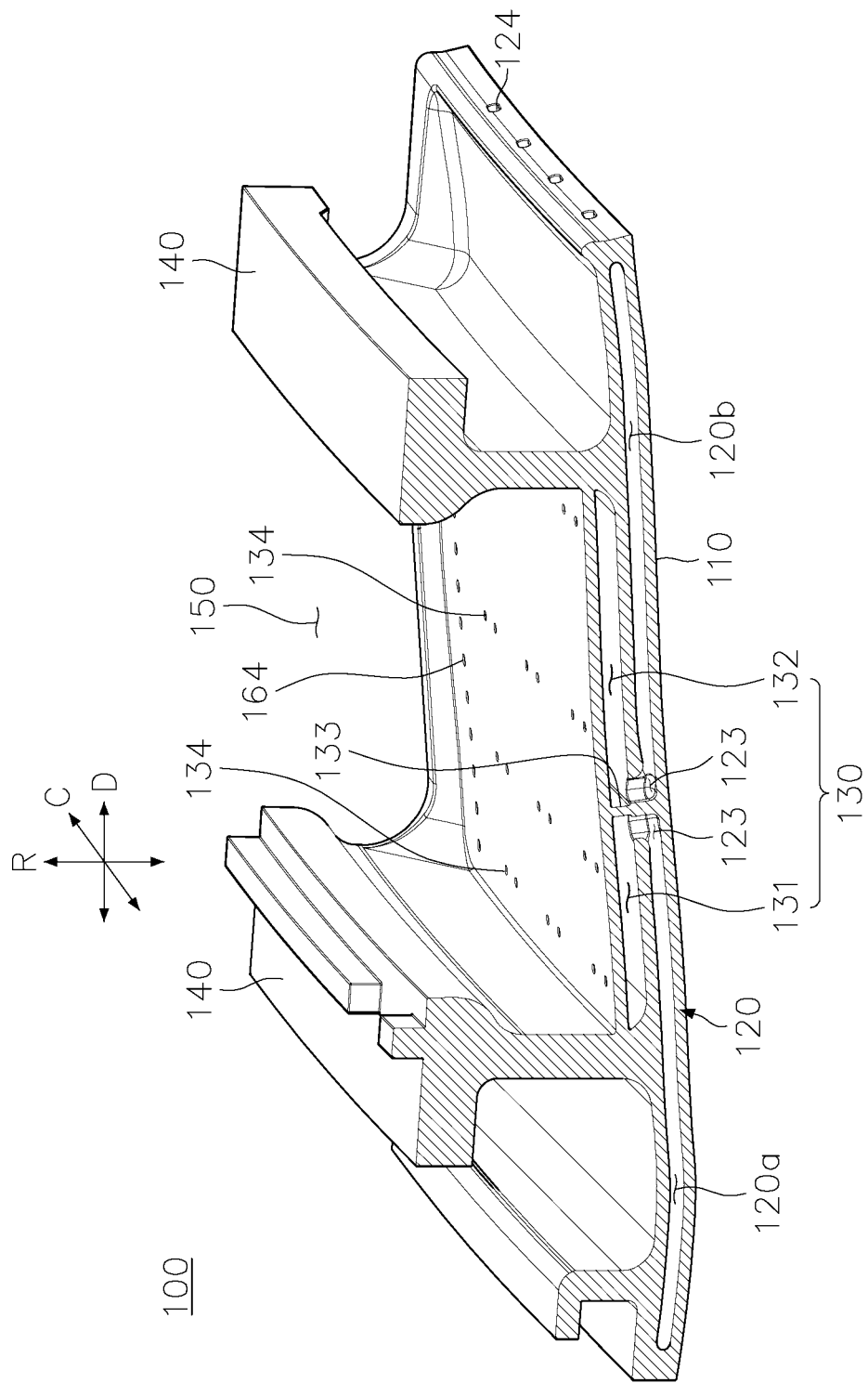
FIG. 3 is a cross-sectional view taken along line Y-Y of FIG. 2.
Figure 4:
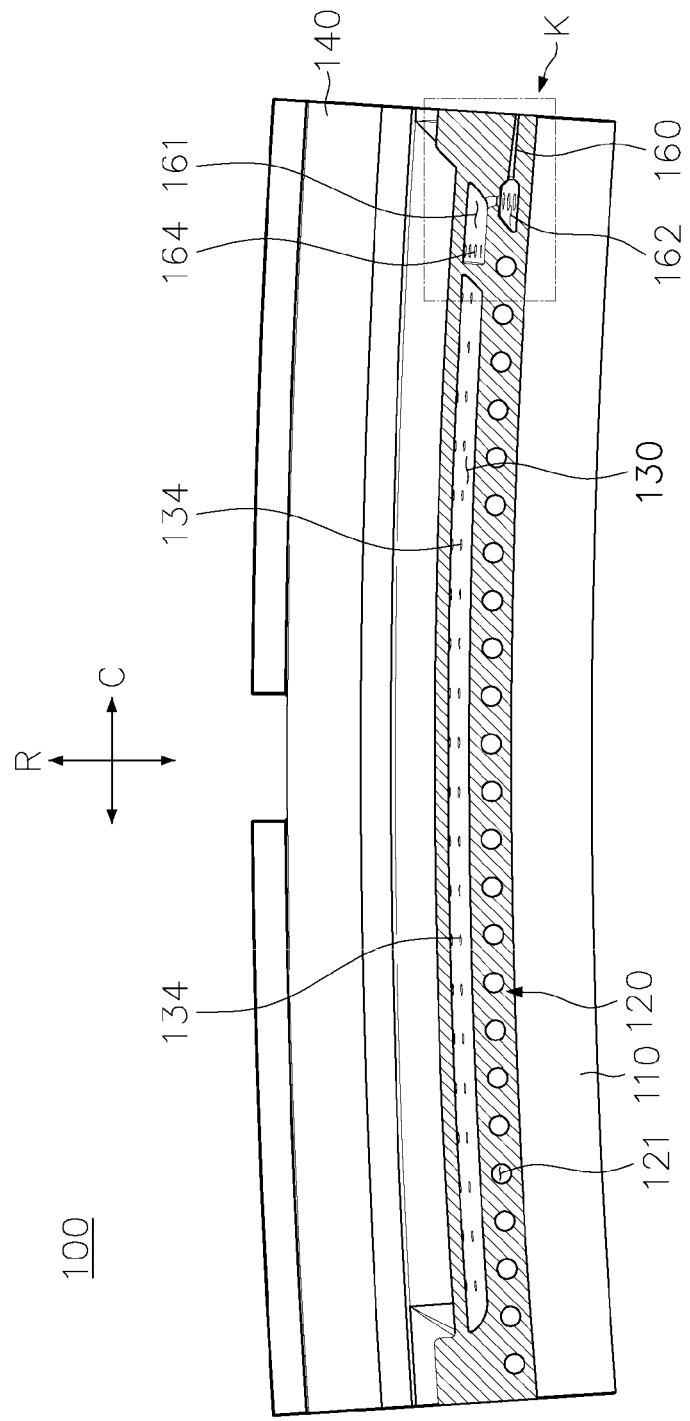
FIG. 4 is a cross-sectional view taken along line Z-Z of FIG. 2.
Figure 5:
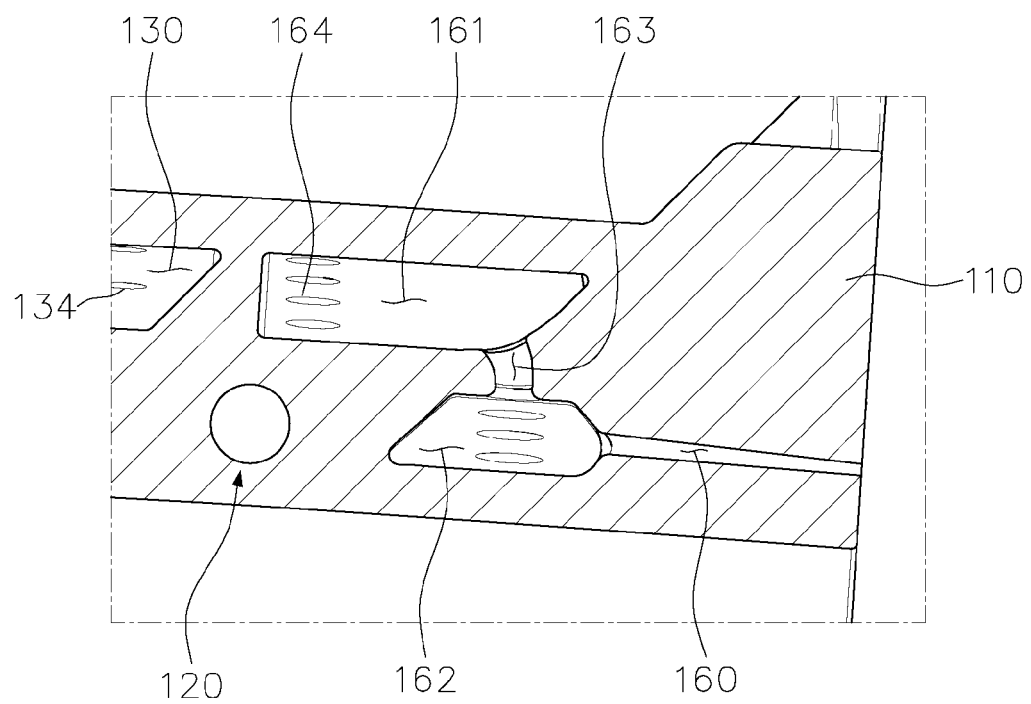
FIG. 5 is an enlarged view illustrating a portion K of FIG. 4.
Figure 6:
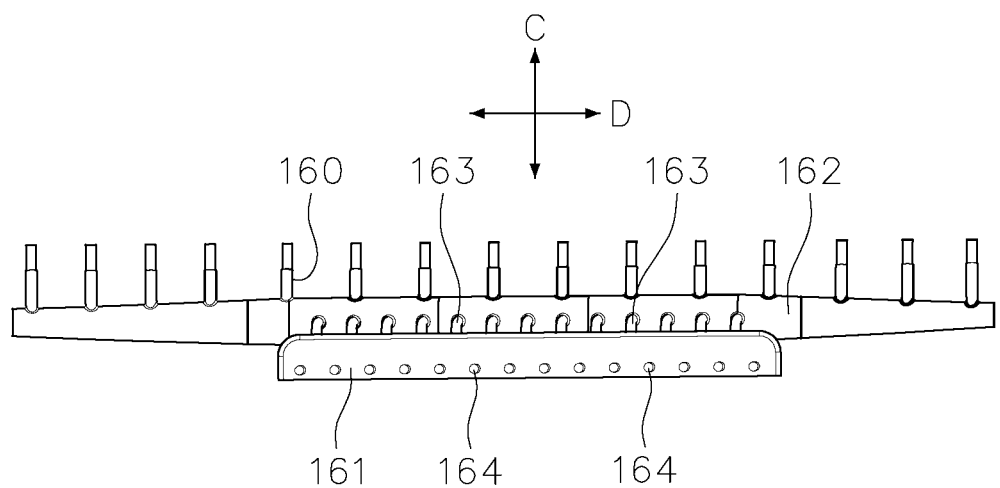
FIG. 6 is a graphic representation of first and second auxiliary cavities and an auxiliary channel of FIG. 5 in a radial direction.

FIG. 2 is a perspective view of a ring segment according to an exemplary embodiment. FIG. 3 is a cross-sectional view taken along line Y-Y of FIG. 2. FIG. 4 is a perspective view of the ring segment partially cut along line Z-Z of FIG. 2. FIG. 5 is an enlarged view illustrating a portion K of FIG. 4. FIG. 6 is a graphic representation of first and second auxiliary cavities and an auxiliary channel of FIG. 5 in a radial direction.

Hereinafter, for convenience of description, reference character C denotes a circumferential direction of the turbine casing 11, reference character R denotes a radial direction of the turbine casing 11, and reference character D denotes a flow direction of fluid flowing through the turbine casing 11. For example, the left side may be an upstream side in the flow direction D of the fluid, and the right side may be a downstream side in the flow direction D of the fluid. If a turbomachine is the gas turbine 1, the fluid flowing along the fluid flow direction D is combustion gas. On the other hand, if the turbomachine is a steam turbine, the fluid flowing along the fluid flow direction D is steam. The fluid flow direction D may be the same as the axial direction of the gas turbine 1 and a longitudinal direction of the tie rod.

Referring to FIGS. 2 to 4, a ring segment 100 according to an exemplary embodiment are installed in an inner circumferential surface of the turbine casing 11 and is disposed to face an end of the turbine blade 22 disposed inside the turbine casing 11. The ring segment 100 includes a segment body 110 and two segment protrusions 140.

The segment body 110 is formed in a plate shape that is bent further outward in the radial direction R toward the downstream side in the flow direction D. The segment body 110 has a cavity and a channel formed therein, and cooling air flows through the cavity and the channel. The cooling air may be compressed air supplied from the compressor 2 or air supplied from an air source disposed outside the gas turbine 1. The segment protrusions 140 protrude outward in the radial direction R of the segment body 110 and are coupled to the inner circumferential surface of the turbine casing 11. The segment protrusions 140 are spaced apart from each other, in the flow direction D to form an RS cavity 150 therebetween. For example, the segment protrusions 140 are formed in an upstream portion and a downstream portion in the flow direction D, respectively.

The cavity includes a cooling cavity 130, a first auxiliary cavity 161, a second auxiliary cavity 162, and a plurality of intermediate cavities 163. The channel includes a plurality of cooling channels 120 and a plurality of auxiliary channels 160.

Referring to FIG. 3, the plurality of cooling channels 120 are disposed relatively inside in the radial direction R of the ring segment 100. Accordingly, the cooling air flowing through the plurality of cooling channels 120 cools the inner portion of the ring segment 100 in the radial direction R of the ring segment 100 heated by the combustion gas. The cooling cavity 130 is disposed outside the plurality of cooling channels 120 in the radial direction R. On the other hand, the segment body 110 has a plurality of cooling holes 134 connecting the RS cavity 150 and the cooling cavity 130, and the cooling holes 134 are formed outside the cooling cavity 130 in the radial direction R. Accordingly, the cooling air supplied to the RS cavity 150 first flows into the cooling cavity 130 through the plurality of cooling holes 134 and then flows into the plurality of cooling channels 120.

The plurality of cooling channels 120 may be divided into a plurality of first cooling channels 120a and a plurality of second cooling channels 120b. Each of the first cooling channels 120a may pass through a downstream end of the segment body 110, extend to an upstream side of the segment body 110, and then return to a downstream side. Each of the second cooling channels 120b may pass through the upstream end of the segment body 110, extend to a downstream side of the segment body 110, and then return to the upstream side. The first cooling channels 120a and the second cooling channels 120b may be alternately arranged in the circumferential direction C.

One cooling channel 120 includes an inlet 123 and an outlet 124.

The inlet 123 is connected to the cooling cavity 130. Accordingly, the cooling air introduced into the cooling cavity 130 from the RS cavity 150 is introduced into the cooling channel 120 through the inlet 123. The outlet 124 communicates with the outside of the segment body 110, and the cooling air flowing through the cooling channel 120 is discharged to the upstream side or the downstream side of the segment body 110. That is, the cooling air sequentially flows the RS cavity 150, the cooling hole 134, the cooling cavity 130, the inlet 123, the cooling channel 120, and the outlet 124 in this order.

The inlet 123 of the first cooling channel 120a and the inlet 123 of the second cooling channel 120b are disposed adjacent to each other along the flow direction D. Each of the first cooling channel 120a and the second cooling channel 120b has two cooling channels adjacent in the circumferential direction C, and a length of one cooling channel in the flow direction D is smaller than a length of the other cooling channel in the flow direction D. Therefore, when the inlet 123 of the first cooling channel 120a and the inlet 123 of the second cooling channel 120b are arranged adjacent to each other in the flow direction D, the short cooling channel of the first cooling channel 120a and the short cooling channel of the second cooling channel 120b are positioned on the same line in the flow direction D. In this case, the plurality of first cooling channels 120a and the plurality of second cooling channels 120b can be formed more densely in one segment body 110. Therefore, the segment body 110 can be cooled more effectively.

The cooling cavity 130 may be divided into a first cooling cavity 131 and a second cooling cavity 132 by a partition wall 133 disposed in the cooling cavity 130. The first cooling cavity 131 is disposed on the upstream side of the partition wall 133, and the second cooling cavity 132 is disposed on the downstream side of the partition wall 133. In addition, the inlet 123 of each of the plurality of first cooling channels 120a is connected to the first cooling cavity 131, and the inlet 123 of each of the plurality of second cooling channels 120b is connected to the second cooling cavity 132. Accordingly, the cooling air introduced into the first cooling cavity 131 through the RS cavity 150 flows into the plurality of first cooling channels 120a to cool the segment body 110, and the cooling air introduced into the second cooling cavity 132 through the RS cavity 150 flows into the plurality of second cooling channels 120b to cool the segment body 110.

According to the ring segment 100 according to the exemplary embodiment, the cooling air supplied to the cooling cavity 130 through the plurality of cooling holes 134 primarily cools the ring segment by colliding with the inner wall surface of the cooling cavity 130, and the cooling air introduced into the plurality of cooling channels 120 from the cooling cavity 130 cools the inner circumferential surface of the ring segment 100 while flowing through the plurality of cooling channels 120. Therefore, the ring segment 100 can be cooled more effectively due to double-stage cooling including the cooling cavity 130 and the plurality of cooling channels 120.

Here, the ring segments 100 are arranged at intervals in the circumferential direction C.

Referring to FIGS. 4 to 6, the plurality of auxiliary channels 160 of each of the ring segments 100 are formed at positions adjacent to opposed surface of another ring segment 100 adjacent to a corresponding one of the ring segments 100, and the plurality of auxiliary channels 160 are arranged at intervals in the flow direction D. In addition, the plurality of auxiliary channels 160 spray the cooling air toward the opposed surface of a corresponding one of the ring segments 100. The first auxiliary cavity 161 supplies cooling air to the plurality of auxiliary channels 160. The segment body 110 has a plurality of auxiliary holes 164 that connect the RS cavity 150 and the first auxiliary cavity 161 and are arranged at intervals in the flow direction D. Accordingly, the cooling air introduced into the RS cavity 150 flows into the first auxiliary cavity 161 through the plurality of auxiliary holes 164.

The second auxiliary cavity 162 is disposed between the first auxiliary cavity 161 and the plurality of auxiliary channels 160, and is disposed inside the first auxiliary cavity 161 in the radial direction R. In addition, the second auxiliary cavity 162 receives the cooling air introduced into the first auxiliary cavity 161 from the RS cavity 150 and supplies the received cooling air to the plurality of auxiliary channels 160. The plurality of intermediate cavities 163 are arranged at intervals in the flow direction D and connect the first auxiliary cavity 161 and the second auxiliary cavity 162 to transfer the cooling air introduced into the first auxiliary cavity 161 to the second auxiliary cavity 162. Here, the plurality of intermediate cavities 163 are formed to have a curvature. For example, the plurality of intermediate cavities 163 are bent inward from the first auxiliary cavity 161 in the radial direction R and are connected to the radially outer side of the second auxiliary cavity 162.

According to the ring segment 100 according to the exemplary embodiment, the cooling air supplied to the first auxiliary cavity 161 through the plurality of auxiliary holes 164 causes primary impingement cooling on the inner wall of the first auxiliary cavity 161, and the cooling air supplied to the first auxiliary cavity 161 and the second auxiliary cavity 162 through the intermediate cavity 163 causes secondary impingement cooling on the inner wall of the second auxiliary cavity 162. In addition, the cooling air supplied to the plurality of auxiliary channels 160 through the second auxiliary cavity 162 is discharged from the ring segment 100 and blown into the adjacent ring segment 100, thereby causing tertiary cooling to the surface of the adjacent ring segment 100. That is, the opposed surfaces of the ring segments 100 adjacent to each other, which are easily heated by the high-temperature fluid (i.e., combustion gas or steam) passing between the ring segments 100 adjacent to each other, can be effectively cooled by the tertiary cooling.

In addition, according to the exemplary embodiment, the inner circumferential surface of the ring segment 100 is cooled by the air flowing through the plurality of cooling channels 120, and the outer surface of the ring segment 100 is cooled by the air flowing through the plurality of auxiliary channels 160. Therefore, both the inner surface and the outer surface of the ring segment 100 can be cooled effectively.

Referring to FIG. 6, each of the plurality of intermediate cavities 163 may be disposed between each of the plurality of auxiliary holes 164. Therefore, the cooling air supplied from the auxiliary hole 164 to the first auxiliary cavity 161 does not directly flow into the intermediate cavity 163 and collides with the inner wall of the first auxiliary cavity 161, thereby causing impingement cooling to the segment body 110.

In addition, referring to FIG. 4, the first auxiliary cavity 161 of one ring segment 100 may be spaced apart from the cooling cavity 130 of the ring segment 100 in the circumferential direction C and may be disposed closer to the next ring segment 100. The plurality of auxiliary channels 160 of one ring segment may be spaced apart from the plurality of cooling channels 120 of the ring segment in the circumferential direction C and may be disposed closer to the next ring segment. The auxiliary cavity 162 is disposed between the plurality of cooling channels 120 and the plurality of auxiliary channels 160.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A ring segment assembly for a turbine comprising:
a turbine casing through which fluid passes from upstream to downstream; and
a plurality of ring segments installed on an inner circumferential surface of the turbine casing, wherein each of the plurality of ring segments comprising:
a segment body disposed inside the turbine casing in a radial direction of the turbine casing and having a channel through which cooling air flows; and
a pair of segment protrusions protruding outward from the segment body, coupled to the inner circumferential surface of the turbine casing, and spaced apart from each other along a flow direction of the fluid flowing through the turbine casing to form an RS cavity through which the cooling air flows,
wherein the segment body includes a cavity configured to supply the cooling air introduced from the RS cavity to the channel disposed radially inward of the cavity in the radial direction,
wherein the cavity includes a cooling cavity comprising a first cooling cavity and a second cooling cavity, which are separated by a partition wall extending along a circumferential direction of the turbine casing, and a first auxiliary cavity spaced apart from the first cooling cavity and the second cooling cavity in the circumferential direction,
wherein the channel comprises a plurality of cooling channels through which the cooling air flows upstream or downstream in the flow direction of the fluid, and
the segment body includes a plurality of cooling holes through which the cooling air is supplied to the first cooling cavity and the second cooling cavity from the RS cavity.

2. The ring segment assembly according to claim 1, wherein the plurality of cooling channels comprise:
a plurality of first cooling channels passing through a downstream end of the segment body in the flow direction of the fluid, extending upstream from the downstream end of the segment body, and extending in a reverse direction downstream from an upstream side of the segment body; and
a plurality of second cooling channels alternately disposed with the plurality of first cooling channels, passing through an upstream end of the segment body in the flow direction of the fluid, extending downstream from the upstream end of the segment body, and extending in a reverse direction upstream from a downstream side of the segment body.

3. The ring segment assembly according to claim 2, wherein the first cooling cavity is configured to communicate with the plurality of first cooling channels and the second cooling cavity is configured to communicate with the plurality of second cooling channels.

4. The ring segment assembly according to claim 1, wherein the plurality of ring segments are provided and arranged at intervals in the circumferential direction,
the channel comprises a plurality of auxiliary channels from which the cooling air is blown to the segment body of a next ring segment, and
the first auxiliary cavity is configured to supply the cooling air to the plurality of auxiliary channels.

5. The ring segment assembly according to claim 4, wherein the cavity further comprises a second auxiliary cavity disposed radially inward of the first auxiliary cavity in the radial direction, receiving the cooling air introduced into the first auxiliary cavity from the RS cavity, and supplying the received cooling air to the plurality of auxiliary channels.

6. The ring segment assembly according to claim 5, wherein the segment body includes a plurality of cooling holes through which the cooling air is supplied to the first auxiliary cavity from the RS cavity,
the cavity further comprises a plurality of intermediate cavities connecting the first auxiliary cavity and the second auxiliary, and
the plurality of intermediate cavities are disposed between the plurality of auxiliary holes when viewed from outside of the segment body in the radial direction.

7. The ring segment assembly according to claim 6, wherein the plurality of intermediate cavities are configured to connect a radially inner portion of the first auxiliary cavity and a radially outer portion of the second auxiliary cavity in the radial direction, and are formed to have a curvature.

8. The ring segment assembly according to claim 1, wherein the plurality of ring segments are provided and arranged at intervals in the circumferential direction,
the plurality of cooling channels are disposed adjacent to an inner surface of the segment body in the radial direction and and the channel further comprises a plurality of auxiliary channels spaced apart from the plurality of cooling channels in the circumferential direction and configured to blow the cooling air to the segment body of a next ring segment, and
the first cooling cavity and the second cooling cavity are disposed radially outward of the plurality of cooling channels in the radial direction and the first auxiliary cavity is configured to supply the cooling air to the plurality of auxiliary channels.

9. The ring segment assembly according to claim 8, wherein the cavity further comprises a second auxiliary cavity disposed inside the first auxiliary cavity in the radial direction, receiving the cooling air introduced into the first auxiliary cavity from the RS cavity, and supplying the received cooling air to the plurality of auxiliary channels, and the second auxiliary cavity is disposed between the plurality of cooling channels and the plurality of auxiliary channels.

10. A turbo machine comprising:
a stator comprising a casing through which fluid passes, a vane coupled to an inner circumferential surface of the casing to guide the fluid, and a ring segment installed on the inner circumferential surface of the casing and disposed between vanes adjacent to each other in a flow direction of the fluid; and
a rotor comprising a disk installed inside the stator and a blade coupled to an outer circumferential surface of the disk and rotated by the fluid,
wherein the ring segment comprises:
a segment body disposed inside the casing in a radial direction of the casing and having a channel through which cooling air flows;
a pair of segment protrusions protruding outward from the segment body, coupled to the inner circumferential surface of the casing, and spaced from each other in a flow direction of the fluid flowing through the casing to form an RS cavity through which the cooling air flows, and wherein the segment body includes a cavity configured to supply the cooling air introduced from the RS cavity to the channel disposed radially inward of the cavity in the radial direction, wherein the cavity includes a cooling cavity comprising a first cooling cavity and a second cooling cavity, which are separated by a partition wall extending along a circumferential direction of the turbine casing, and a first auxiliary cavity spaced apart from the first cooling cavity and the second cooling cavity in the circumferential direction, wherein the channel comprises a plurality of cooling channels through which the cooling air flows upstream or downstream in the flow direction of the fluid, and the segment body includes a plurality of cooling holes through which the cooling air is supplied to the first cooling cavity and the second cooling cavity from the RS cavity.

11. The turbo machine according to claim 10, wherein the plurality of cooling channels comprise:
   a plurality of first cooling channels passing through a downstream end of the segment body in the flow direction of the fluid, extending upstream from the downstream end of the segment body, and extending in a reverse direction downstream from an upstream side of the segment body; and
   a plurality of second cooling channels alternately disposed with the plurality of first cooling channels, passing through an upstream end of the segment body in the flow direction of the fluid, extending downstream from the upstream end of the segment body, and extending in a reverse direction upstream from a downstream side of the segment body.

12. The turbo machine according to claim 11, wherein the first cooling cavity is configured to communicate with the plurality of first cooling channels and the second cooling cavity is configured to communicate with the plurality of second cooling channels.

13. The turbo machine according to claim 10, wherein a plurality of ring segments are provided and arranged at intervals in the circumferential direction of the casing,
   the channel comprises a plurality of auxiliary channels from which the cooling air is blown to the segment body of a next ring segment, and
   the first auxiliary cavity is configured to supply the cooling air to the plurality of auxiliary channels.

14. The turbo machine according to claim 13, wherein the cavity further comprises a second auxiliary cavity disposed radially inward of the first auxiliary cavity in the radial direction of the casing, receiving the cooling air introduced into the first auxiliary cavity from the RS cavity, and supplying the received cooling air to the plurality of auxiliary channels.

15. The turbo machine according to claim 14, wherein the segment body includes a plurality of cooling holes through which the cooling air is supplied to the first auxiliary cavity from the RS cavity,
   the cavity further comprises a plurality of intermediate cavities connecting the first auxiliary cavity and the second auxiliary, and
   the plurality of intermediate cavities are disposed between the plurality of auxiliary holes when viewed from outside of the segment body in the radial direction of the casing.

16. The turbo machine according to claim 15, wherein the plurality of intermediate cavities are configured to connect a radially inner portion of the first auxiliary cavity and a radially outer portion of the second auxiliary cavity in the radial direction of the casing, and are formed to have a curvature.

17. The turbo machine according to claim 10, wherein
   a plurality of ring segments are provided and arranged at intervals in the circumferential direction of the casing,
   the plurality of cooling channels are disposed adjacent to an inner surface of the segment body in the radial direction of the casing and and the channel further comprises a plurality of auxiliary channels spaced apart from the plurality of cooling channels in the circumferential direction of the casing and configured to blow the cooling air to the segment body of a next ring segment, and
   the first cooling cavity and the second cooling cavity are disposed radially outward of the plurality of cooling channels in the radial direction of the casing, and a first auxiliary cavity is configured to supply the cooling air to the plurality of auxiliary channels.

18. The turbo machine according to claim 17, wherein the cavity further comprises a second auxiliary cavity disposed inside the first auxiliary cavity in the radial direction of the casing, receiving the cooling air introduced into the first auxiliary cavity from the RS cavity, and supplying the received cooling air to the plurality of auxiliary channels, and
   the second auxiliary cavity is disposed between the plurality of cooling channels and the plurality of auxiliary channels.

* * * * *